United States Patent [19]

Ninomiya et al.

[11] Patent Number: 4,510,910

[45] Date of Patent: Apr. 16, 1985

[54] IGNITION TIMING CONTROL METHOD AND APPARATUS FOR INTERNAL COMBUSTION ENGINES

[75] Inventors: Masakazu Ninomiya, Kariya; Toshi Suda, Nagoya; Norio Omori; Susumu Akiyama, both of Kariya; Hiroyasu Fukaya, Nagoya, all of Japan

[73] Assignee: Nippondenso Co., Ltd., Kariya, Japan

[21] Appl. No.: 578,295

[22] Filed: Feb. 8, 1984

Related U.S. Application Data

[63] Continuation of Ser. No. 289,997, Aug. 4, 1981, abandoned.

[30] Foreign Application Priority Data

Aug. 8, 1980 [JP] Japan .................................. 55-109705

[51] Int. Cl.³ ........................ F02B 3/00; F02D 5/00; G06F 15/20; F02P 5/04
[52] U.S. Cl. .................................... 123/486; 123/480; 123/417; 123/440
[58] Field of Search ............... 123/486, 417, 418, 425, 123/419, 480, 440; 364/431

[56] References Cited

U.S. PATENT DOCUMENTS

| | | | |
|---|---|---|---|
| 4,099,495 | 7/1978 | Kiencke et al. | 123/486 |
| 4,130,095 | 12/1978 | Bowler et al. | 123/440 |
| 4,181,944 | 1/1980 | Yamauchi et al. | 123/480 |
| 4,204,256 | 5/1980 | Klotzner | 123/417 |
| 4,231,091 | 10/1980 | Motz | 123/417 |
| 4,348,729 | 9/1982 | Sasayama et al. | 123/486 |
| 4,351,306 | 9/1982 | Luckman et al. | 123/417 |

Primary Examiner—Raymond A. Nelli
Attorney, Agent, or Firm—Cushman, Darby & Cushman

[57] ABSTRACT

An ignition timing control method and an apparatus for internal combustion engines in which the ignition timing of the engine is calculated from a base value obtained by detecting a first operation state of the engine and from a learned correction value obtained in accordance with the record content of a nonvolatile memory, the ignition timing being corrected by rewriting the nonvolatile memory in accordance with the detection result of second and third driving states of the engine, as desired.

6 Claims, 20 Drawing Figures

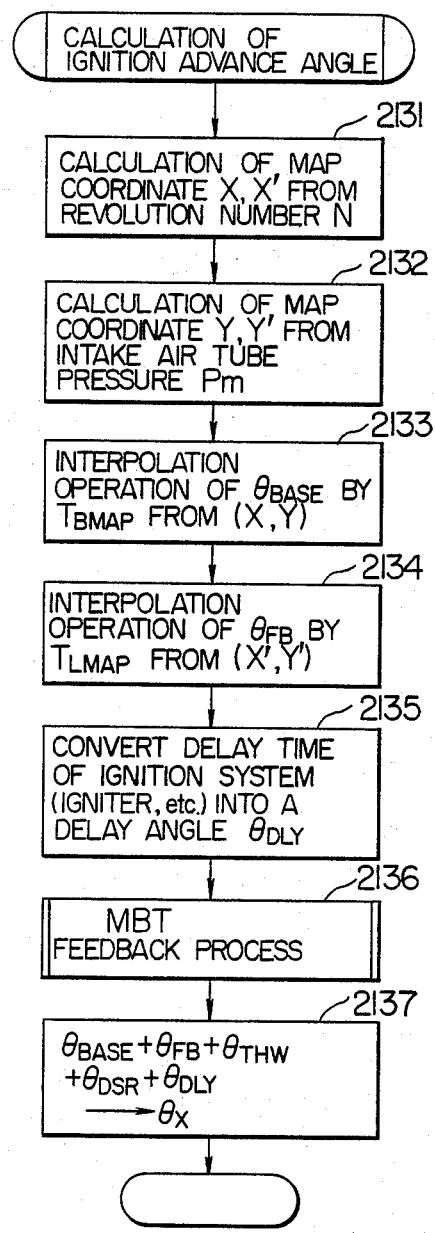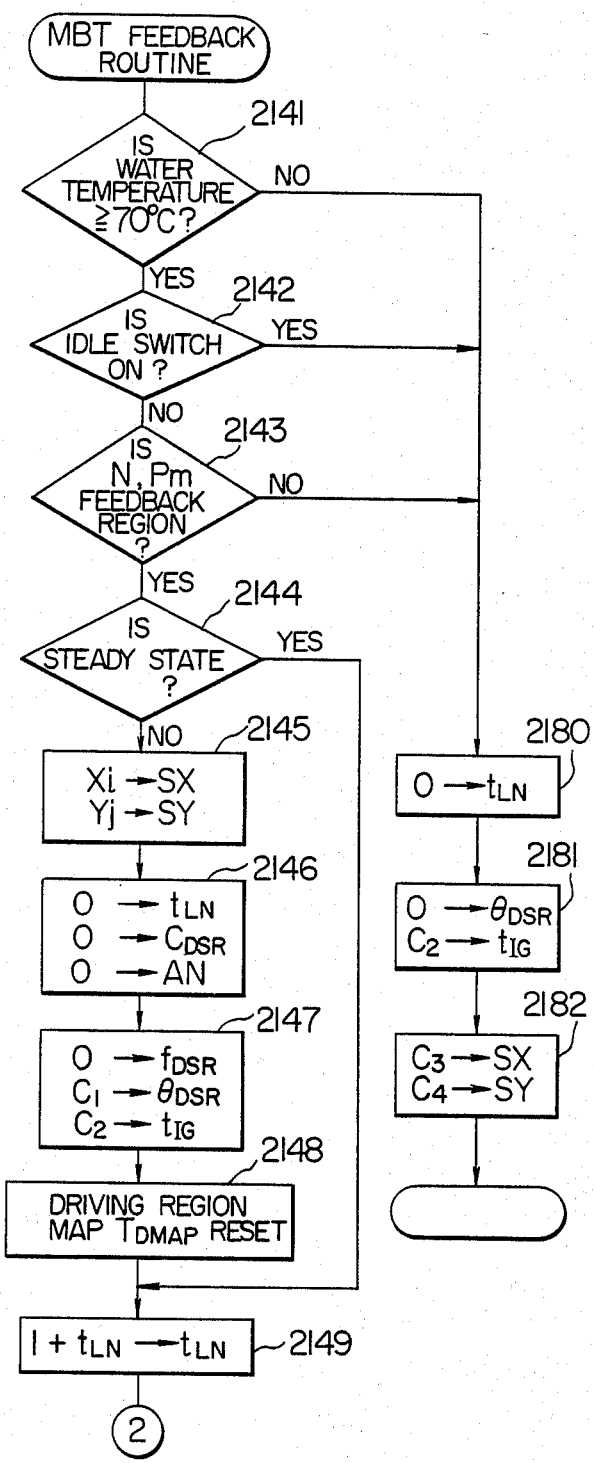

FIG. 9

T<sub>BMAP</sub>

| INTAKE PRESSURE Pm (mmHg) \ ENGINE SPEED (rpm) | | 500 | 1000 | 1500 | 2000 | 2500 | 3000 | 3500 | 4000 | 4500 | 5000 | 5500 | 6000 |
|---|---|---|---|---|---|---|---|---|---|---|---|---|---|
| | X<br>Y | 0 | 1 | 2 | 3 | 4 | 5 | 6 | 7 | 8 | 9 | 10 | 11 |
| 160 | 0 | | | | | | | | | | | | |
| 210 | 1 | | | | | | | | | | | | |
| 260 | 2 | | | | | | | | | | | | |
| 310 | 3 | | | | | | | | | | | | |
| 360 | 4 | | | | | | | | | | | | |
| 410 | 5 | | | | | | | | | | | | |
| 460 | 6 | | | | | | | | | | | | |
| 510 | 7 | | | | | | | | | | | | |
| 560 | 8 | | | | | | | | | | | | |
| 610 | 9 | | | | | | | | | | | | |
| 660 | 10 | | | | | | | | | | | | |
| 710 | 11 | | | | | | | | | | | | |
| 760 | 12 | | | | | | | | | | | | |

FIG. 10

T_LMAP

| ENGINE SPEED (rpm) / INTAKE PRESSURE Pm (mmHg) | X' / Y' | 1250 | 1700 | 2150 | 2600 | 3050 | 3500 | 3950 | 4400 | 4850 | 5300 | 5750 | 6200 |
|---|---|---|---|---|---|---|---|---|---|---|---|---|---|
| | | 0 | 1 | 2 | 3 | 4 | 5 | 6 | 7 | 8 | 9 | 10 | 11 |
| 280 | 0 | | | | | | | | | | | | |
| 320 | 1 | | | | | | | | | | | | |
| 360 | 2 | | | | | | | | | | | | |
| 400 | 3 | | | | | | | | | | | | |
| 440 | 4 | | | | | a | b | c | d | | | | |
| 480 | 5 | | | | | e | f | g | h | | | | |
| 520 | 6 | | | | | i | j | k | ℓ | | | | |
| 560 | 7 | | | | | m | n | o | p | | | | |
| 600 | 8 | | | | | | | | | | | | |
| 640 | 9 | | | | | | | | | | | | |
| 680 | 10 | | | | | | | | | | | | |
| 720 | 11 | | | | | | | | | | | | |
| 760 | 12 | | | | | | | | | | | | |

FIG. 13
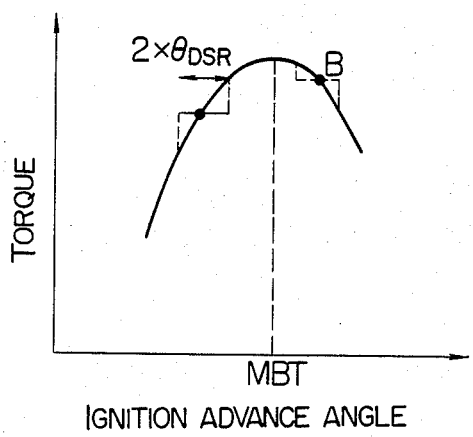
FIG. 14
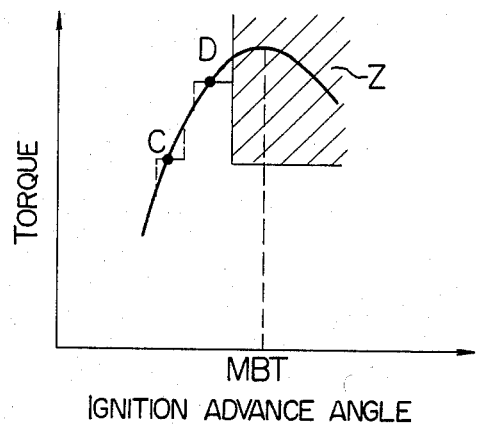
FIG. 15
| Y'\X' | X'ᵢ₋₁ | X'ᵢ | X'ᵢ₊₁ |
|---|---|---|---|
| Y'ⱼ₋₁ | | | |
| Y'ⱼ | | (SX,SY) | |
| Y'ⱼ₊₁ | | | |
FIG. 17
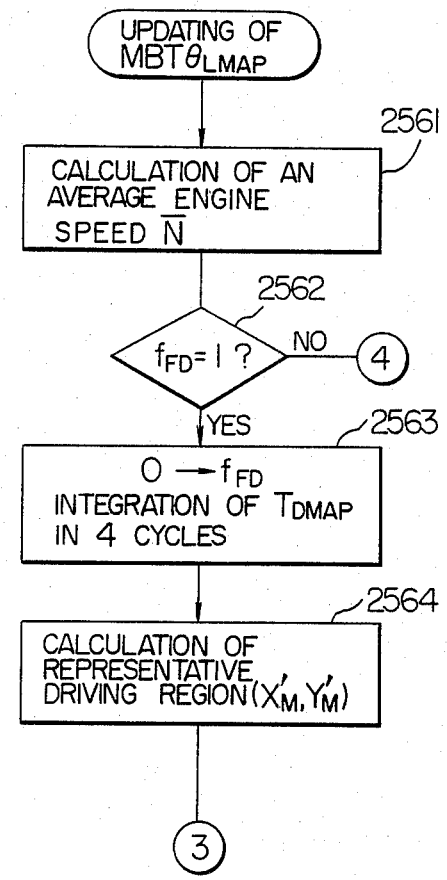

IGNITION TIMING CONTROL METHOD AND APPARATUS FOR INTERNAL COMBUSTION ENGINES

This is a continuation of application Ser. No. 289,997, filed Aug. 4, 1981 now abandoned as of the filing date accorded this application.

BACKGROUND OF THE INVENTION

This invention relates to a method and an apparatus for feedback control of the ignition timing of internal combustion engines in order to increase the output of the engines and improve the fuel consumption rate.

The ignition timing of an internal combustion engine has been controlled by the engine speed and the intake pressure, etc. depending on a driving state of the engine, to maximize the output of the engine and at the same time minimize the fuel consumption rate, so long as there are no speical problems such as knocking or exhaust gas emission, etc. arising. However, due to variations of each engine and variations in environmental conditions it has been difficult to control timing accurately. Hence, a certain decrease in output and an increase in fuel consumption rate have been unavoidable.

As another method for increasing the output of the engine and reducing the fuel consumption rate, ignition timing has been feedback controlled. A base value of the ignition timing of the engine is recorded in a memory and the record content is rewritten depending on the occurrence of knocking, etc. However, in this method, the record content of the memory is rewritten only by a signal indicating the driving state such as the occurrence of knocking, etc. It has been difficult to control accurately the ignition timing to the standard value.

SUMMARY OF THE INVENTION

This invention aims to solve these defects in the prior art methods. A first driving state of the engine is detected to calculate a base ignition timing. This base ignition timing is corrected in accordance with the prescribed record content of a nonvolatile memory capable of being rewritten and the ignition timing of the engine is calculated. A prescribed record content of the nonvolatile memory is rewritten by two signals indicating second and third driving states of the engine. In this way, the invention aims to provide a method and an apparatus for an internal combustion engine capable of very accurately controlling the ignition timing to a standard value without increasing the number of nonvolatile meories.

Furthermore, according to this invention, the prescribed record content of the nonvolatile memory capable of being rewritten is rewritten by a signal which indicates whether the ignition timing of the engine is advanced or delayed from the maximum torque ignition timing and also by a signal indicating the number of occurrences of knockings. In this way, the invention aims to provide a method and an apparatus for controlling the ignition timing of an internal combustion engine, in which to drive the engine at an optimum ignition timing with a low fuel consumption rate and at the same time prevention of the occurrence of knockings is ensured.

BRIEF DESCRIPTION OF THE DRAWINGS

FIGS. 4 to 8, FIG. 11, and FIGS. 16 to 20 are flow charts showing the steps of operation processes of the control computer in FIG. 1.

FIGS. 9, 10 and 15 are map schematic diagrams used for the explanation of the operation of the apparatus as shown in FIG. 1.

FIGS. 13 and 14 are characteristic diagrams showing corrections toward the optimum ignition timing.

DESCRIPTION OF THE PREFERRED EMBODIMENTS

One embodiment of an apparatus to which this invention is applied will be explained hereinafter with reference to the drawings.

Figure 1:
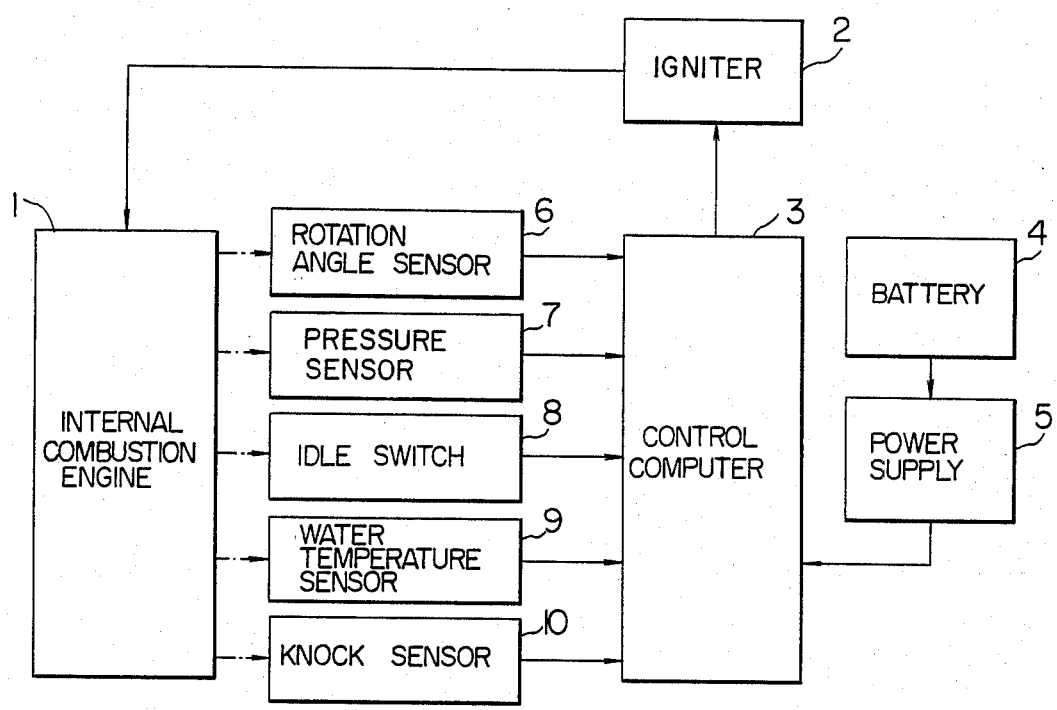
FIG. 1 is a constitution diagram showing an embodiment of an apparatus to which this invention is applied.

FIG. 1 is a block diagram of the apparatus. The system comprises an internal combustion engine 1, an ignition means 2 such as an igniter, a control computer 3 using a microprocessor, a battery 4, a power supply circuit 5, a rotation angle sensor 6, a pressure sensor 7 for detecting the pressure of the intake pipe of the engine 1, an idle switch 8 for discriminating the idling state of the engine 1, a water temperature sensor 9 for detecting the temperature of the cooling water for the engine 1, and a knock sensor 10 for detecting knocking of the engine 1. The control computer 3 detects the operation state of the engine from the outputs of the rotation angle sensor 6 and the pressure sensor 7, etc. and calculates the ignition timing at the present state. Signals for the ignition timing and the power supply start timing in accordance with the calculated result are sent to the igniter 2.

The idle switch 8 is provided to detect the fully closed position of a throttle valve. If the ignition timing is controlled at an optimum ignition timing in the idling state, the engine speed increases, which however causes a deterioration of the fuel consumption rate. Hence, in the idling state, a signal for interrupting the control of the optimum ignition timing is generated. The water temperature sensor 9 comprises a thermister, etc. and detects the temperature of the cooling water. In the warming running process after the start of engine, the optimum ignition timing varies rapidly and hence the control can not always follow the process completely. Therefore, the output signal of the water temperature sensor 9 is used to stop the control of the optimum ignition timing until cooling water temperature is reached to a predetermined value. The knock sensor 10 is provided to detect the vibration of the engine indicative of knocking of the engine. But, detailed explanation thereof will be omitted since it is publicly known well.

Figure 2:
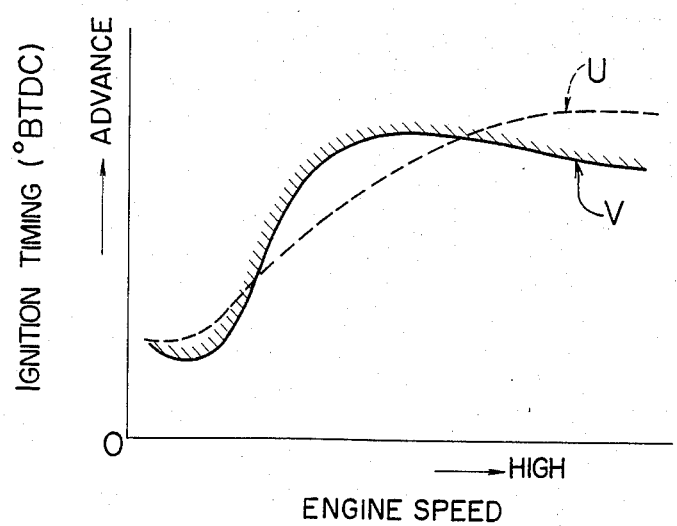
FIG. 2 is a characteristic diagram showing the maximum torque ignition timing and an ignition timing for the onset of the occurrence of knocking vs. the engine speed.

FIG. 2 shows the maximum torque ignition timing U and the ignition timing V at the start of the occurrence of a knocking vs. the engine speed, when the engine is operated in the full open state of the throttle valve. Here, the optimum ignition timing is defined as the maximum torque ignition timing, when no knocking happens. But, the optimum timing should be retarded to the ignition timing at the start of knocking, when knocking occurs if the ignition timing is advanced to the maximum torque timing.

Next, detailed explanation will be made of the control computer using the above-mentioned microprocessor. CPU30 is a central processing unit which calculates the optimum ignition timing depending on the program. In this example, use is made of a microprocessor TMS9900 of Texas Instruments INC. with 16 bits construction. ROM38 is a read only memory unit which records a control program together with control constants. RAM39 is a random access memory (temporary memory unit) which is used by CPU30 during its operation in accordance with the control program. A nonvolatile RAM37 is a memory capable of being rewritten. It records the leaning optimum ignition timing. As distinct from RAM39, RAM37 has a structure that the content is held without erasement even if the ignition key switch of the engine is turned off. Namely, RAM37 contains a simple supplementary power supply such as a miniature battery. Alternatively, instead of the supplementary power supply, RAM37 may be supplied with power directly from a car-mounted battery 4 without passing the ignition key switch. The memory element itself may be made of non-volatile type.

An interruption control section 32 reports an occurrence of interruption to CPU in 3 levels of preference. In this embodiment, there are three kinds of causes for interruption; the gear interruption due to the generation of a rotation angle signal pulse of the rotation angle sensor 6 of the engine (so named because a gear-shaped rotor is used for the rotation angle sensor), the program interruption which happens when CPU30 itself sets the level of the program interruption output port of a digital input-output port 35 at the "0" level, and the timer interruption which happens each time a timer elapses 8 msec.

The timer section 33 consists of a 16 bits counter which counts 8 μsec. clock signals and a latch which stores and holds the value of the counter every time when a rotation angle signal pulse of the rotation angle sensor 6 is generated. Thus, CPU30 reads out the value of the crank angle counter section 34 through the interruption process by the generation of a rotation angle pulse and knows the position of the crank angle of the engine, while at the same time reads out latch values of the timer section 33 in the position of two crank positions and determines a difference of the latch values, whereby the rotation time of the engine between the two crank angle positions can be measured and further the engine speed can be measured.

The counter which constitutes the crank angle counter section 34 is a six scale counter, which counts up with each crank angle signal from the rotation angle sensor 6 at each 30° crank angle (hereinafter the crank angle will be abbreviated to CA). The value of the counter is reset to "0" by the generation of a crank angle signal just after the generation of top dead center signals of #1 and #3 cylinders (in the case of 4-cylinder engine) and thereby synchronized with the rotation of the engine. Therefore, it is possible to learn the position of the crank angle of the engine in the unit of 30° CA as the CPU 30 reads out the value of crank angle counter.

The digital input-output port 35 is a port which is used for the input-output of logical signals. In order to discriminate that a start switch (not shown) at the start of the engine is set on, a voltage level is introduced to the starter from the start switch. Further, the port is used to generate a program interruption signal which is supplied to the interruption control part 32. Then, a signal indicating the state of the idle switch 8 in gang with the throttle valve and a signal from the knocking detection circuit 36 discriminating whether any knocking has happened in the ignition timing are introduced. In executing the program, the digital input part is read out, as occasion demands, whereby CPU 30 can detect the state of the starter switch and the idle switch and also the presence or the absence of knocking.

As publicly known, the knock detection circuit 36 discriminates the presence of knocking if the signal from the knock sensor 10 between ATDC 0° and 60° is larger than the average background level of the knock sensor signal. Otherwise, it determines that knocking is absent. The result is sent to the digital input-output port 35.

The analog input port 31 is provided to measure the voltage value of the analog signal, and to A/D (analog-digital) convert the output voltage signal of the pressure sensor 7, the output voltage signal of the water temperature sensor 9 and the battery voltage. In accordance with a demand from CPU30, the converted data are transferred through a common bus 41.

The power supply ignition control part 40 generates a power supply signal and an ignition signal to the igniter 2. The power supply ignition control part 40 has a plurality of down-counters.

As will be described later, the down-count start instruction and indication of the down-count value of the following crank angle signal are done in the gear interruption process routine which is generated by a rotation angle signal pulse just before the rotation angle signal for starting the down-count for power supply or ignition. By the introduction of a next crank angle signal, down-count for power supply or ignition is started. When the value of down-count becomes "0", either the power supply signal (level "0") or the ignition signal (level "1") are sent to the ignition means 2. CPU30 executes the control of ambient circuits and the transfer of data through the common bus 41.

Explanation will be made hereinafter of the constitution of the control program, the operation and the control method according to the embodiment. The system of this embodiment has three interruptions having a preference order, as shown in Table 1. They are a gear interruption, a program interruption and a timer interruption in the order of higher preference level. The main routine is executed in the process free from these interruptions.

TABLE 1

| Preference order | Routine name |
| --- | --- |
| interruption of highest preference | gear interruption process routine |
| interruption of the second order preference | program process interruption routine |
| interruption of the third order preference | timer interruption process routine |
| usual execution process (non-interruption process) | main routine |

Program processing will be explained next.

Figure 20:
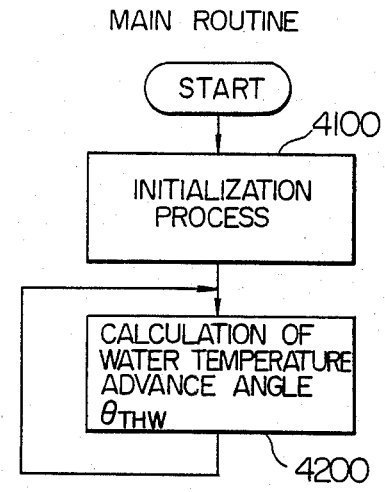

FIG. 20 shows a flat chart of the main routine. The initialization process is done in a step 4100, where clearance of RAM area, introduction of various kinds of initial parameters, and allowance of interruptions are also done. In a step 4200, an A/D converted value of the water temperature is introduced into the analog input port 31. In accordance with this value, a correction value of the water temperature advance angle $\theta_{THW}$ is calculated from a one dimensional map. This step is always executed when no interruption process happens.

Figure 3:
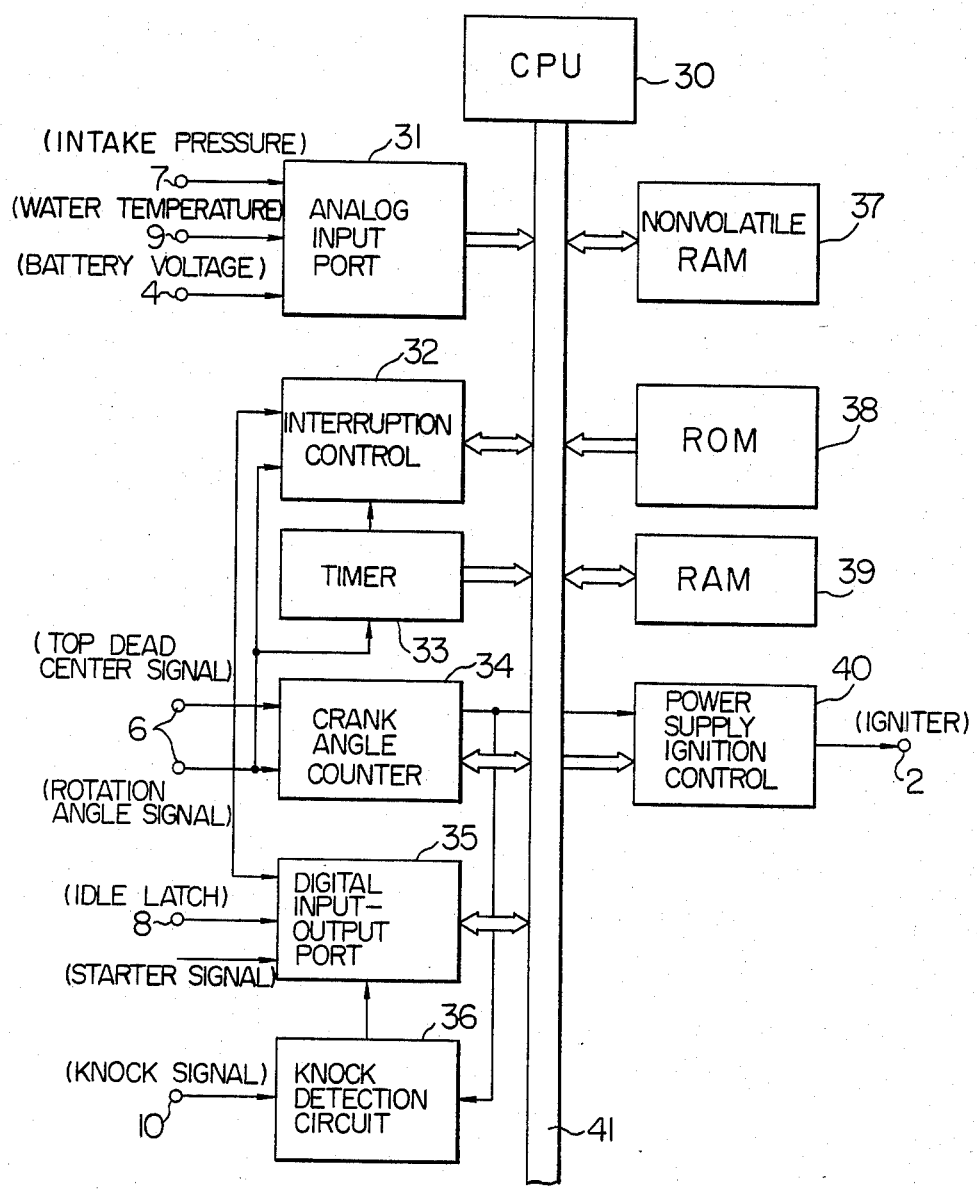
FIG. 3 is a detailed constitution diagram of a control computer in FIG. 1.
Figure 4:
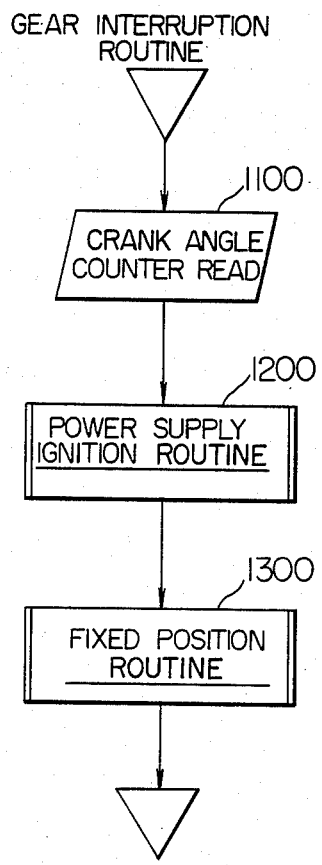

FIG. 4 shows a flow chart of the gear interruption routine, which has the highest order of preference and hence is executed most preferentially. The start of this gear interruption is done by a crank angle pulse which is applied to the interruption control part 32. Therefore, the gear interruption occurs at each 30° CA with the position of TDC set at 0° CA. After the start, in a step 1100, CPU30 reads the present position of the crank shaft through the READ operation of the counter part 34 as shown in FIG. 3, and knows the crank angle of the engine. In the power supply and ignition processes in a step 1200, data are set in the current supply-ignition control part 40 in accordance with the power supply and ignition control data as calculated in a later described program interruption routine to control the power supply and the ignition. Next, in the fixed position process of a step 1300, a process of a fixed crank angle is performed.

Figure 5:
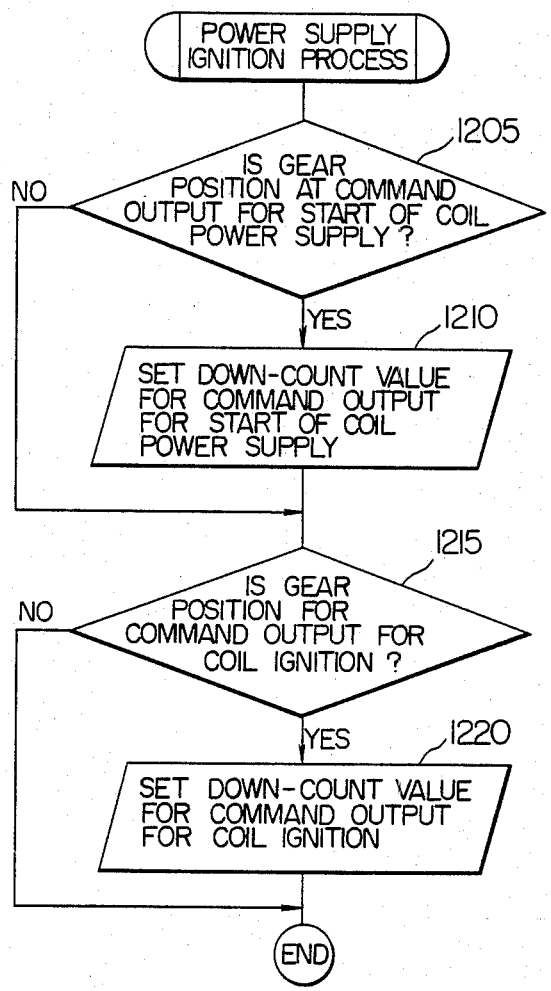

FIG. 5 shows a detailed flow chart of the step of power supply and ignition processes. In a step 1205, an angle for yielding a down-count instruction for the start of power supply to the ignition coil is compared with the present crank angle position obtained in the step 1100. If a coincidence is obtained, in a step 1210 the down-count value is set in the down-counter of the power supply-ignition control part 40 (FIG. 3) for the power supply to the ignition coil. At the same time, an instruction for a power supply to the ignition coil is generated. This down-counter is down counted by a clock signal of 8 μsec which is supplied from the timer part 33. When the count value becomes "0", the power supply signal of the ignition coil is made "0", and the power supply starts. In a step 1215, an angle for starting the down-count for charging the coil is compared with the present crank angle obtained in the step 1100. If a coincidence happens, in a step 1220 the count value is set in the down-counter for charging of the power supply-ignition control part 40 (FIG. 3). At the same time, an instruction for the charging of the ignition coil is generated. This down-counter is down counted by a 8 μsec clock signal. When the count value becomes "0", the ignition coil power supply signal is made to logic "1" to stop the power supply to the coil, since ignition corresponds to cessation of the power supply to the ignition coil.

Figure 6:
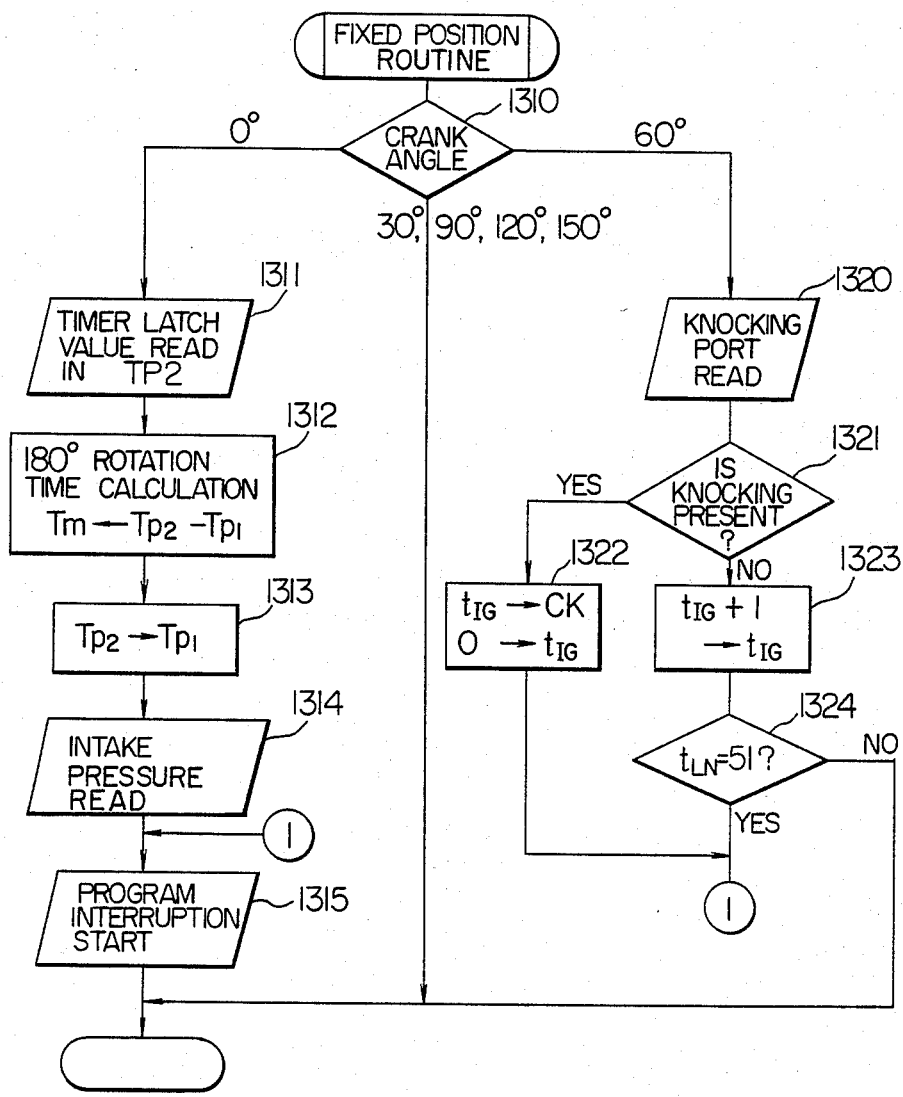

FIG. 6 shows a detail flow chart of a step 1300 of the fixed position process. While in the step 1200 of power supply and ignition processes, the angle position with which the process operates effectively varies with a value calculated in the program interruption, in the step 1300 of the fixed position process, the process is executed in a predetermined angle position. The rotation time required for a rotation of 180° CA of the crank shaft from 0° CA and the pressure in the intake pipe are measured, and program interruption is generated. The presence and the appearance of knocking at 60° CA are discriminated. This process is explained next in more detail. The crank angle is discriminated in a step 1310. In the case of 0° CA, the program proceeds to a step 1311 where the time of 180° rotation is measured. Namely, using the timer part 33 of FIG. 3, the latched real time timer value is introduced in the step 1311. In a step 1312, the time of 180° rotation, Tm, is obtained as $$Tm = T_{p2} - T_{p1}, \quad (1)$$

where $T_{p1}$ is the timer value as previously introduced in a step 1312. In a step 1313, the value of $T_{p2}$ is transferred to $T_{p1}$. In a step 1314, in order to work out a countermeasure to the ripple of intake pressure, an A/D converted value $V_{pm}$ of the pressure of intake pipe is introduced in synchronization with the predetermined crank angle. Further, in a step 1315, the program interruption output port of the digital input-output port 35 is made "1" after it was made "0", to generate a program interruption signal and to start the program interruption routine.

In the case of 60° CA in the step 1310, the program proceeds to a step 1320, where the output of the knock detection circuit 36 (FIG. 3) is read in through the digital input-output port 35. As a result, if it is determined in the step 1320 that no knocking occurred at the ignition just before the step 1320, the count value of the knock interval ignition counter $t_{IG}$ is incremented by one in a step 1323. The knock interval ignition counter $t_{IG}$ is a counter which counts the number of ignitions between neighboring knockings. If it is determined in a step 1321 that a knocking occurred, the program proceeds to a step 1322. The content of the knock interval ignition counter is transferred into a knock interval ignition register CK to reset $t_{IG}$ to "0". The register CK expresses the interval from the time of the generation of a previous knocking to the time of the generation of a present knocking as the number of ignitions, which is inversely proportional to the knocking frequency. Then, the program proceeds to a step 1315 to start the program interruption and to renew a later-mentioned learning gain angle map $T_{LAMP}$. If no knocking occurs, the program proceeds to a step 1324 to determine the feedback learning period by the count value of the feedback ignition number counter $t_{LN}$. In this embodiment, a later mentioned duty period is set to be a period of 50 ignitions. If the count value of the counter $t_{LN}$ is 51, a program interruption is started in the step 1315 and the learned gain angle map $T_{LAMP}$ is corrected.

In the step 1310, if the crank angle is neither 0° CA nor 60° CA, but 30° CA, 90° CA, 120° CA or 150° CA, nothing is done and the fixed position process ends.

Figure 7:
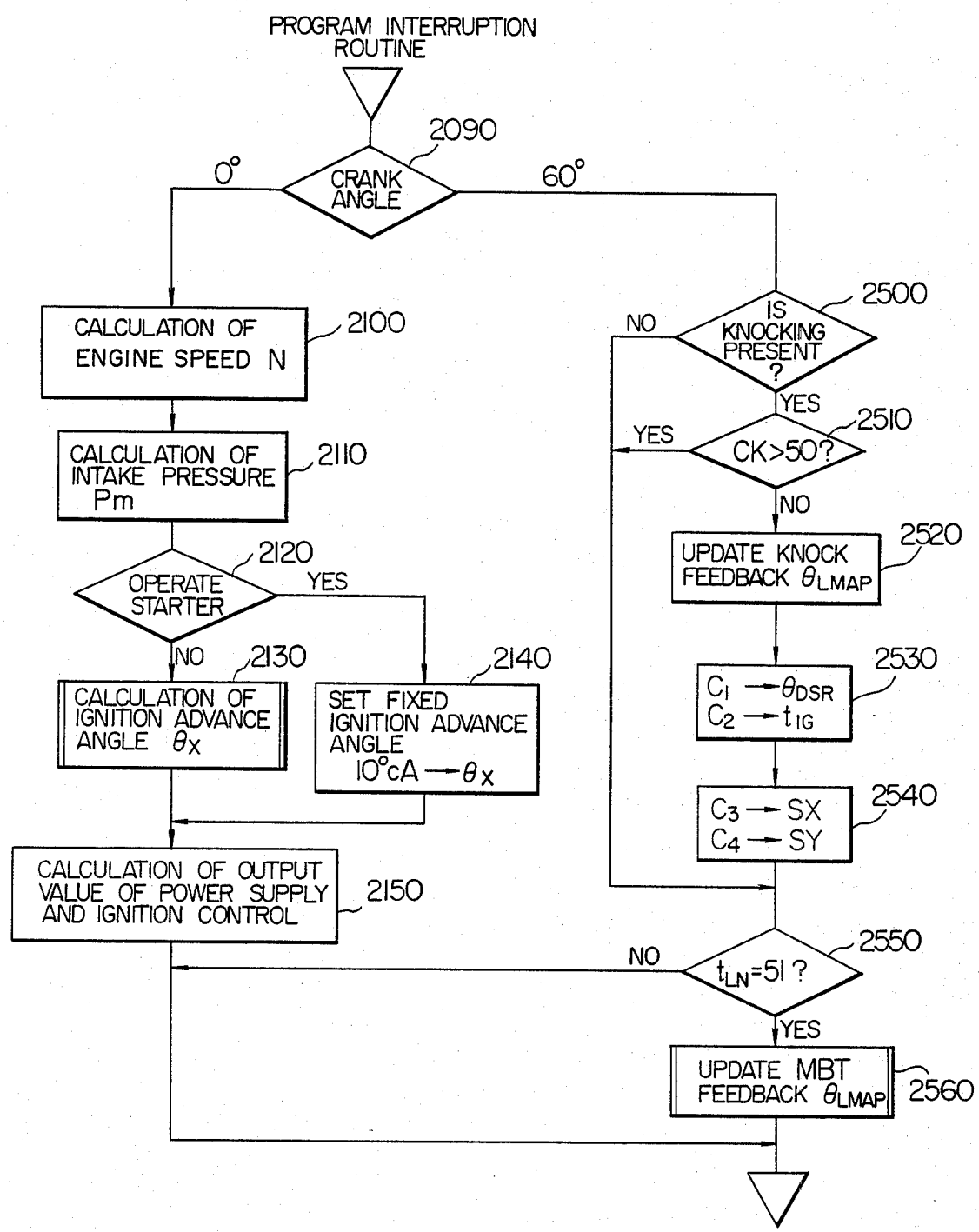

FIG. 7 shows a program interruption routine as started in the step 1315. First, in a step 2090, the value determined in the step 1310 is discriminated to be either 0° CA or 60° CA. The ignition timing calculation process in the case of 0° CA will be explained in detail. In a step 2100, the number of revolution N is calculated from the rotation time Tm of 180° as obtained in the step 1312 by eq. (2).

$$N(r.p.m) = 10^7 \times \frac{3}{Tm(\mu s)} \quad (2)$$

In a step 2110, the A/D converted values $V_{pm}$ of the intake pressure at 0° CA and 180° CA obtained in the step 1314 is converted into an intake pressure Pm (mm Hg unit) as $$Pm = A_1 \times V_{pm} + A_2 \quad (3)$$

where $A_1$ and $A_2$ are conversion coefficients. In a step 2120, the signal from the start switch of the engine is checked. If the switch is on, the fixed advance angle 10° is selected to be the final ignition advance angle $\theta_x$ in a step 2140 and the program proceeds to a step 2150, where an output to the power supply ignition control part 40 is calculated. If the starter is not operating, the program proceeds to a step 2130 where the final ignition advance angle $\theta_x$ is calculated. Then, in the step 2150, an output to the power supply ignition control part 40 is calculated as before. At the end of the step 2150, the program interruption is finished. Either the timer interruption routine or the main routine is started again.

Explanation of the step 2130 of calculating the ignition advance angle $\theta_x$ will be made hereinafter with reference to FIGS. 8 to 10. FIG. 9 shows an example of two dimensional base advance angle map $T_{BAMP}$ as stored in ROM 38 of FIG. 3. FIG. 10 shows an example of two-dimensional learning advance angle map $T_{LAMP}$ as stored in the non-volatile RAM 37 which can hold the content even if the ignition key switch is turned off. $T_{LAMP}$ is continually rewritten in a later mentioned feedback learning process such that $\theta_x$ becomes equal to the optimum ignition advance angle free from generation of knocking and giving the maximum torque and the minimum fuel consumption rate. The abscissas of $T_{BAMP}$ and $T_{LAMP}$ are given by the engine speed N of the engine, which is proportional to the row numbers X and X′ corresponding to the abscissa. The ordinate is the intake pressure Pm, which is proportional to the column numbers Y and Y′ corresponding to the ordinate. First, in a step 2131, the engine speed N is converted into a row number X according to eq. (4).

$$\left.\begin{array}{l}\text{(i) } X = 0, \text{ if } N < 500 \text{ r.p.m,} \\ \text{(ii) } X = Xi + \Delta X \\ \Delta X = \dfrac{N - N_{xi}}{N_{xi+1} - N_{xi}}, \text{ if } N_{xi} \leq N < N_{xi+1} \\ \text{(iii) } X = 11, \text{ if } N \geq 6000 \text{ r.p.m.}\end{array}\right\} \quad (4)$$

Here, $N_{xi}$ is the maximum engine speed not exceeding N as shown in the map abscissa, Xi is the row number corresponding to $N_{xi}$ and is an integer, and the dicimal fraction of X means an engine speed between two neighboring numbers shown in the map abscissa. Xi′ and $\Delta X'$ are calculated from the engine speed N in a similar way. In a step 2132, the intake pressure Pm is converted into a column number Y according to eq. (5).

$$\left.\begin{array}{l}\text{(i) } Y = 0 \text{ if } Y < 160 \text{ mmHg,} \\ \text{(ii) } Y = Yi + \Delta Y \\ \Delta Y = \dfrac{Pm - PmYi}{Pm\,Y_{i+1} - PmYi} \\ \quad \text{if } PmYi \leq Pm < Pm\,Yi + 1 \\ \text{(iii) } Y = 12 \text{ if } Pm \geq 760 \text{ mmHg.}\end{array}\right\} \quad (5)$$

Here, PmYi is the maximum intake pressure not exceeding Pm as shown in the map ordinate, Yi is the column number corresponding to PmYi, and the decimal fraction of Y means a pressure between two neighboring pressures shown in the map ordinate. Yj′ and $\Delta Y'$ are calculated from the learned gain angle map $T_{LAMP}$. In a step 2133, a base advance angle $\theta_{BASE}$ corresponding to X and Y is calculated from the base advance angle map ($T_{BMAP}$) through 4 points interpolution by eq. (6).

$$\left.\begin{array}{l}\theta_{BASE} = (1 - \Delta X) \cdot (1 - \Delta Y) \cdot T_{BMAP}(X_i, Y_i) + \\ (1 - \Delta Y) \cdot \Delta X \cdot T_{BMAP}(X_{i+1}, Y_i) + \\ \Delta Y \cdot (1 - \Delta X) \cdot T_{BMAP}(X_i, Y_{i+1}) + \\ \Delta Y \cdot \Delta X \cdot T_{BMAP}(X_{i+1}, Y_{i+1}),\end{array}\right\} \quad (6)$$

where $X = X_i + \Delta X \quad (0 \leq \Delta X < 1),$
$Y = Y_i + \Delta Y \quad (0 \leq \Delta Y < 1).$ Similarly in a step 2134, the correction value $\theta_{FB}$ of a learned feedback gain angle corresponding to the above-mentioned X′ and Y′ is calculated from the learned gain angle map $T_{LMAP}$ through 4 points interpolation by eq. (7).

$$\left.\begin{array}{l}\theta_{FB} = (1 - \Delta X') \cdot (1 - \Delta Y') \cdot T_{LMAP}(X_j', Y_j') + \\ (1 - \Delta Y') \cdot \Delta X' \cdot T_{LMAP}(X_{j+1}', Y_j') + \\ \Delta Y' \cdot (1 - \Delta X') \cdot T_{LMAP}(X_j', Y_{j+1}') + \\ \Delta X' \cdot \Delta Y' \cdot T_{LMAP}(X_{j+1}', Y_{j+1}'),\end{array}\right\} \quad (7)$$

where $X' = X_j' + \Delta X',$
$Y' = Y_j' + \Delta Y'.$

In a step 2135, a delay of the ignition signal due to the igniter, etc. is converted into a crank angle and defined as a correction value $\theta_{DLY}$ for the ignition delay angle. The relation is given by eq. (8).

$$\theta_{DLY} = t_{DLY} \times 180/Tm \quad (8)$$

where $t_{DLY}$ is a delay time of the ignition signal by the ignition (40 to 100 μsec), and Tm is the rotation time (μsec) of 180°.

Figure 12:
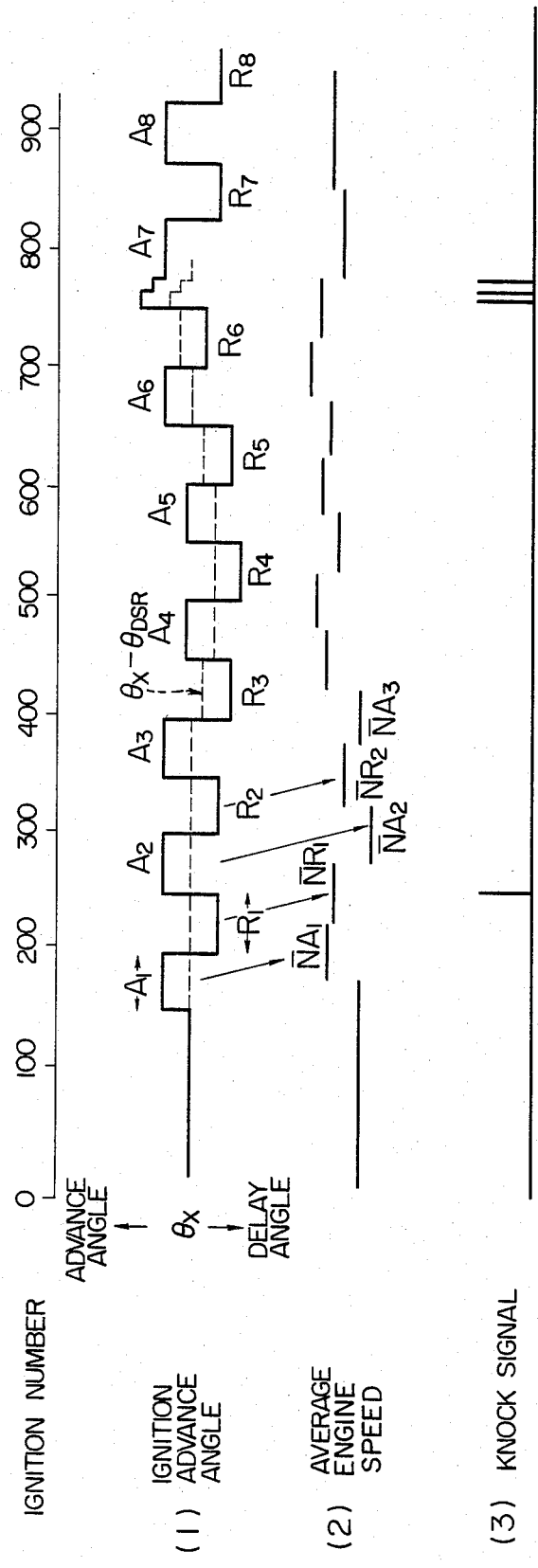
FIG. 12 is a time chart used for the explanation of the operation of the apparatus as shown in FIG. 1.

Next, in step 2136, a feedback process of the optimum ignition timing MBT (Minimum spark advance for Best Torque) is performed. Explanation of this feedback process will be made with reference to FIG. 11. In this embodiment, for every 50 ignitions (which may be a suitable value between 40 and 200) the ignition timing calculated from the operation state of the engine is alternately advanced or retarded by a constant hunting angle $\theta_{DSR}$ (a suitable value between 1° and 6°). A resultant minute difference in the engine speed is detected and a value in the learned gain angle map $T_{LMAP}$ is rewritten in the direction of increasing the engine speed. Swing of the ignition timing as described above will be referred to "hunt" hereinafter. FIG. 12 shows a time chart of the ignition advance angle control according to this embodiment. In order to help understanding, a steady state is assumed in FIG. 12 between the ignition values of 0 and 900. Therefore, the value of base advance angle $\theta_{BASE}$, the correction value of ignition delay angle $\theta_{DLY}$, and the correction value of the water temperature advance angle $\theta_{THW}$ are all constant. The variation of the ignition advanced angle $\theta_x$ coincides with the variation of the hunt value $\theta_{DSR}$ and the learned advanced angle correction value $\theta_{FB}$. In FIG. 12, the MBT feedback control is started from the ignition timing of 1500. Firstly, as shown in FIG. 12(1), the angle is advanced at $A_1$ and $A_2$ while delayed at $R_1$ and $R_2$. After the elapse of two hunting cycles of advance and delay angles from the start of hunting cycle, the average rotation numbers at the head of each hunting cycle as shown in FIG. 12(2) are compared. At the end of the hunting cycles, (i) If $\overline{N}_{Ri-2} < \overline{N}_{Ai-1} > \overline{N}_{Ri-1} < \overline{N}_{Ai}$, $T_{LMAP}(N, Pm)$ is advanced in angle (ii) If $\overline{N}_{Ri-2} > \overline{N}_{Ai-1} < \overline{N}_{Ri-1} > \overline{N}_{Ai}$, $T_{LMAP}(N, Pm)$ is delayed in angle.

In other cases, no correction is made. Furthermore, at the end of the hunting cycles, (iii) If $\overline{N}_{Aj-1} > \overline{N}_{Rj-1} < \overline{N}_{Aj} > \overline{N}_{Rj}$, $T_{LMAP}(N, Pm)$ is advanced in angle.

(iv) If $\overline{N}_{Aj-1} < \overline{N}_{Rj-1} > \overline{N}_{Aj} < \overline{N}_{Rj}$, $T_{LMAP}(N, Pm)$ is delayed in angle.

In other cases, no correction is made.

In FIG. 12, the average rotation number is compared at the beginning of the hunt cycle $A_3$. Since $\overline{N}_{A1} > \overline{N}_{R1} > \overline{N}_{A2} > \overline{N}_{R2}$, neither the learned advanced angle $\theta_{FB}$ non $\theta_x$ varies. At the beginning of the hunting cycle $R_3$, the condition (ii) holds, i.e., $\overline{N}_{R1} > \overline{N}_{A2} < \overline{N}_{R2} > \overline{N}_{A3}$. Hence, $T_{LMAP}$ is renewed. $\theta_{FB}$ is rewritten in the direction of the delaying angle. Therefore, $\theta_x$-$\theta_{DSR}$ at $R_3$ (dotted line in FIG. 12) is on the side of delayed angle. Similarly, at the beginning of the hunt cycles $A_6$, and $R_5$, and $R_6$, the afore-mentioned conditions (i) and (iii) hold respectively. $\theta_x$-$\theta_{DSR}$ is advanced approaching to MBT. However, in the hunt cycle $A_7$, three knockings happen as shown in FIG. 12(3). Since their intervals are short, the angle is delayed immediately. The hunting cycle is stopped. After the angle is delayed to the domain free from knocking, the feedback cycle is started again. It should be noted here that the hunting cycle always start with a cycle of advanced angle.

Thus, when no knocking happens, the learned advanced angle map $T_{LMAP}$ (N, Pm) under the corresponding driving condition of the engine is rewritten such that the ignition advance angle $\theta_x$ becomes MBT, as shown in FIG. 13. Namely, if the ignition timing is at a point A, the conditions (i) and (iii) for the variation of torque (variation of rotation number) make the ignition timing approach to MBT, while if the ignition timing is at a point B on the opposite side, the conditions (ii) and (iv) bring the same result. If the knocking zone Z is on the delayed side of MBT as shown in FIG. 14, the hunting cycle is immediately interrupted by detecting adjacent knockings. $T_{LMAP}$ (N, Pm) under this driving condition is made to have a value of delayed angle, and feedback is started again. Therefore, if $T_{LMAP}$ (N, Pm) is on a point C, the conditions (i) and (iii) make the ignition timing to approach not to MBT but to D.

In FIG. 11, in steps of 2141 to 2143, it is determined whether the feedback condition holds. In the step 2141, if the water temperature calculated by a later mentioned main routine is above 70° C., the program proceeds to a step 2180. In the next step 2142, it is determined whether the idle switch is on by reading the signal from the digital input-output port 35 of FIG. 3. If the switch is off, the program proceeds to the step 2143, while if the switch is on it jumps to the step 2180. Furthermore, in the step 2143, if the present driving condition (N, Pm) is within the learned advance angle map region, the program proceeds to a step 2144. Otherwise, the program jumps to step 2180. In the step 2144, it is determined whether a steady state drive was done in the feedback cycle. In the learning advance angle map $T_{LMAP}$ in FIG. 10, if the present state driving region is out of the driving region at the beginning of the feedback cycle, i.e. the driving region (SX, SY) and eight points around it, e.g. the regions a, b, c, e, f, g, i, j, k in the case of (SX, SY)=f, (i.e. if the driving region moves to n), it is determined to be an acceleration-deceleration state. The program proceeds to a step 2145 and the driving region pointer (SX, SY) at the beginning of a cycle is renewed to the present driving region (X$_i'$, X$_j'$). Further, in step 2146, the feedback ignition number counter $t_{LN}$ and the hunting number counter $C_{DSB}$ are reset. A later-mentioned integration value of the revolution number is set "0". In a step 2147, the hunting flag $f_{DSR}$ is reset. The hunting angle $\theta_{DSR}$ is set at a prescribed value (e.g. a suitable value between 1° and 6° CA, e.g. 3° CA). The afore-mentioned knock interval ignition counter $t_{IG}$ is set to have a maximum value $C_2$. The driving region ignition number map $T_{DMAP}$ is a two dimensional map as as shown in FIG. 15. It indicates the ignition number in each driving region after the start of feedback. The central point (X$_i'$, Y$_j'$) of $T_{DMAP}$ coincides with (SX, SY). In a step 2148, all the nine counters in $T_{DMAP}$ are reset to "0". That is, in steps 2145 to 2148, a process for starting the feedback is performed.

Figure 16:
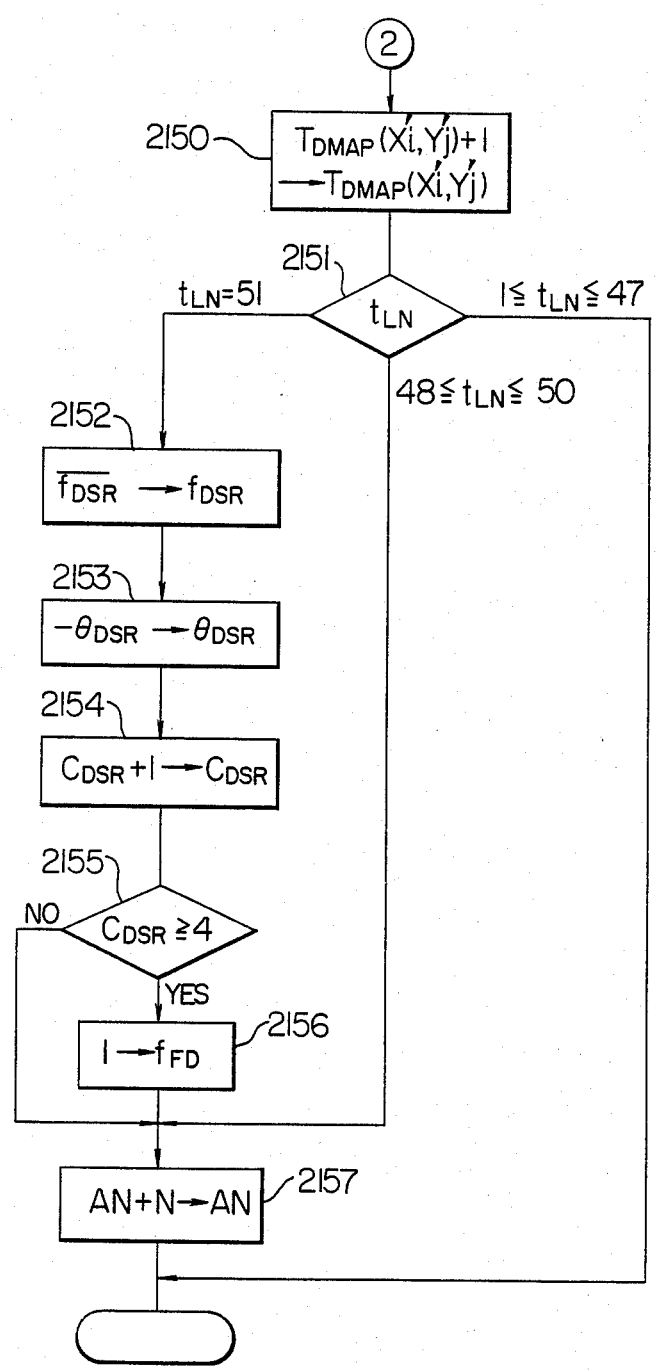

If the feedback condition is not satisfied, the program jumps to the step 2180, where the counter $t_{LN}$ is reset. Further, in a step 2181, "0" is substituted in the hunting angle $\theta_{DSR}$ and the counter $t_{IG}$ is set to have a maximum value $C_2$. In a step 2182, if the feedback condition is satisfied, values $C_3$ and $C_4$ are substituted into SX and SY respectively in order to execute the feedback starting processes 2145 to 2148, $C_3$ and $C_4$ being values which do not appear in the actual driving condition, whereby the MBT feedback process is finished. Now, if it is determined to be a steady state in the step 2144, the program proceeds immediately to a step 2149, where the feedback ignition number counter $t_{LN}$ increase its count by one. Then the program proceeds to a step 2150 of FIG. 16, where the counter $T_{DMAP}$ (X$_i'$, Y$_j'$) corresponding to the present driving condition in the driving region ignition number map increases its count by one. Next, in a step 2151, the value of the feedback ignition number counter $t_{LN}$ is checked. If it is 51, the program proceeds to a step 2152. If it is between 48 and 50, the program jumps to a step 2157. If it is between 1 and 47, the MBT process is finished.

In steps 2152 and 2153, a hunting cycle is finished and a subsequent hunting cycle is started. In the step 2152, the hunting flag is inverted. In the step 2153, the hunting angle is switched either from an advanced to a delayed angle or from a delayed to an advanced angle. In a step 2154, the hunting number counter $C_{DSR}$ is counted up by one. In a following step 2155, it is determined whether $C_{DSR}$ is equal to or larger than 4, or not. Namely, it is checked whether 4 hunting cycles have elapsed after the start of feedback. If so, the feedback learning flag $f_{FD}$ is set. As described later, the learning advance angle map $T_{LMAP}$ is renewed by evaluating the average engine speed $\overline{N}$ in each hunting cycle in the program interruption as started by the gear interruption of 60° CA. If not so, the program proceeds immediately to the step 2157 where the engine speed N calculated in the step 2100 is added to the integration value of engine speed AN for the calculation of the average engine speed $\overline{N}$.

After the MBT feedback process is finished, the program proceeds to a step 2137 of FIG. 8 where the ignition advance angle $\theta_x$ is corrected by $\theta_{BASE}$, $\theta_{FB}$, $\theta_{DSR}$ and $\theta_{DLY}$ as calculated in steps 2131 to 2133 and by the water temperature advance angle $\theta_{THW}$ as calculated in the main routine, or $\theta_x = \theta_{BASE} + \theta_{FB} + \theta_{DSR} + \theta_{DLY} + \theta_{THW}$. Thus, the calculation of the ignition advance angle $\theta_x$ is finished, and the program proceeds to a step 2150 of FIG. 7 in order to calculate an output value to the power supply ignition control part 40.

In the step 2150, the ignition crank angle is determined by calculating $90 - \theta_x$. Further, a power supply crank angle is determined by a power supply time $\tau_{ON}$ as calculated in a later mentioned timer interruption routine. The ignition and power supply crank angles are converted to a crank angle signal of 0°, 30°, or 60° and a down-count value (in the unit of 8 μsec) which interpolates the crank angle signal. The power supply to the ignition coil and the ignition are executed by the aforementioned power supply ignition process in FIG. 5.

In the program interruption started by 60° CA in FIG. 7, the program proceeds to a step 2500, where the presence or the absence of a knocking signal introduced in step 1320 is determined. In the absence of the knocking signal, the program jumps to a step 2550, while in the presence thereof the program proceeds to a step 2510, where it is determined whether the ignition number CK in an interval from a previous knocking to the present knocking is above 50 or not. If CK > 50, the program jumps to a step 2550 while otherwise it proceeds to a step 2520 where the learning advance angle map $T_{LMAP}(X', Y')$ under the driving condition with an occurrence of knocking is delayed by eq. (9).

$$T_{LMAP}(X_i', Y_j') - C_5 \rightarrow T_{LMAP}(X_i', Y_j'), \quad (9)$$

where $C_5$ is a constant with a value between 0.1° and 3° CA. If it should be noted here that $(X_i', Y_j')$ is a program interruption started not by a just previous 0° CA but by a one more previous 0° CA. Namely, $(X_i', Y_j')$ is made to have values calculated from eqs. (4) and (5) in steps 2131 and 2132.

As described above, in this embodiment, the learning control of the advance angle is done such that CK exceeds 50 or the knocking rate ($=1/CK=$ number of knockings/ignition number $\times 100$%) is below 2%. In steps 2530 and 2540, a process for feedback reset is done. If the MBT feedback condition holds, the feedback initialization by a step 2145 is done in the MBT feedback process as started by the following 0° CA. Next, the program proceeds to a step 2550 where the MBT feedback learning timing (just after the beginning of a new hunting cycle) is determined. If $t_{LN} \neq 51$ or $t_{LN} 21\ 51$, the program interruption is started only by the generation of knocking and the process is finished. If it is in a learning timing, the program proceeds to a step 2560, where the learned advance angle map $\theta_{LMAP}$ is corrected.

Figure 18:
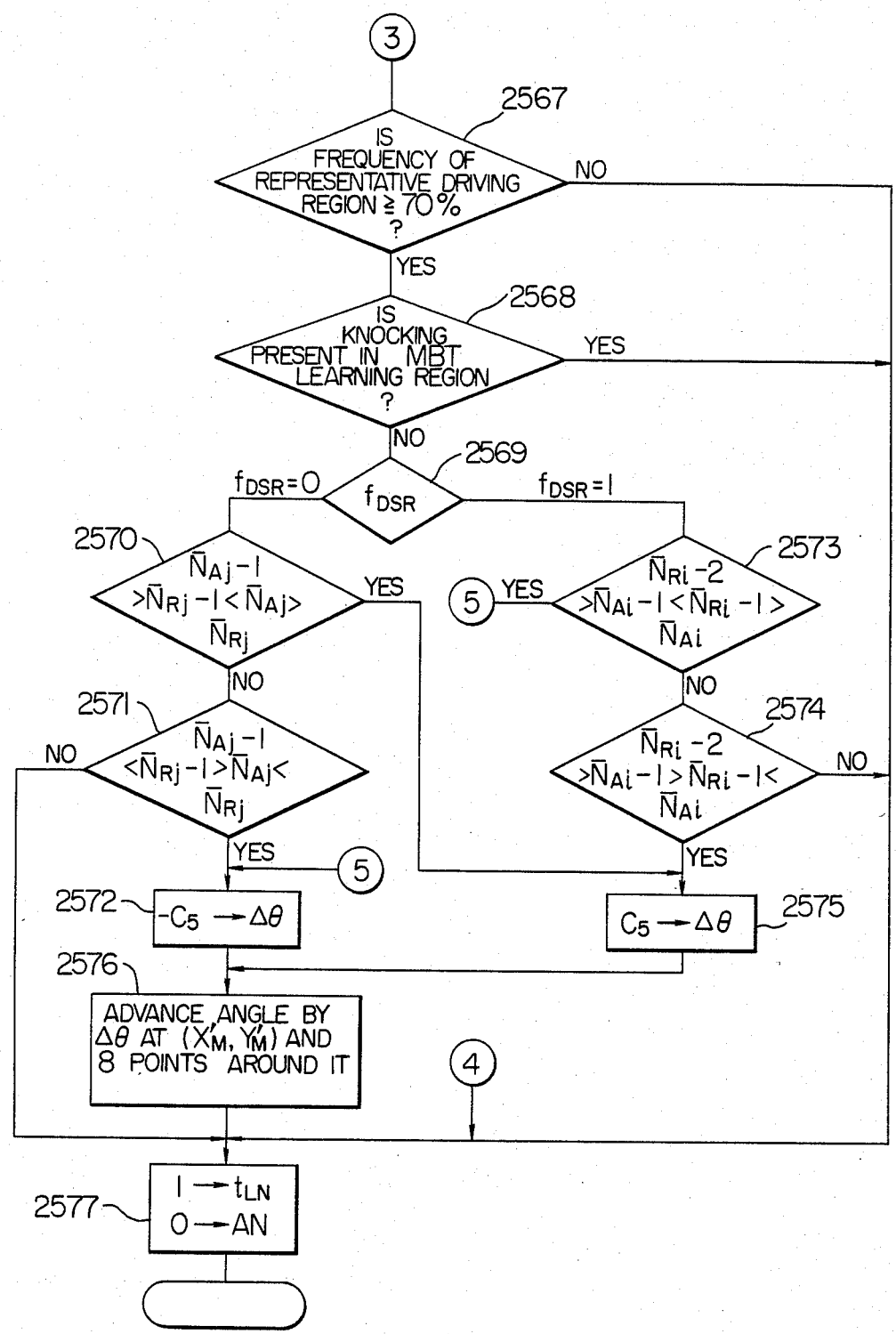

FIGS. 17 and 18 show details of the step 2560 for renewing the MBT feedback $\theta_{LMAP}$. In a step 2561, the average engine speed in a duty cycle is calculated. In this embodiment, the afore-mentioned integration value of the engine speed is taken as the average engine speed $\bar{N}$. That is, AN is an integrated value of the engine speed measured in the last two rotations of each hunting cycle (4 times of 180° CA). The program proceeds then to a step 2562 where it is checked whether 4 hunting cycles have elapsed after the beginning of feedback. If so, the feedback learning flag $f_{FD}$ was set in the step 2156 and the program proceeds to a step 2563. If not so, the flag was not set. The program jumps to a step 2577. In the step 2563, the flag $f_{FD}$ is reset. All the 9 counters of the corresponding driving region ignition number map $T_{DMAP}$ in the past 4 hunting cycles are added. Since one $T_{DMAP}$ corresponds to each hunting cycle, there are 4 $T_{DMAP}$'s which are renewed in each hunting cycle sequentially. In the step 2564, of the 9 counters of the added $T_{DMAP}$, we define $(X_M', Y_M')$ as an element which has the maximum value. Namely, the representative driving region $(X_M', Y_M')$ is the most frequent driving region (engine state) in the past 4 hunting cycles. In a step 2567, it is determined whether this most frequent region existed more than e.g. 70% in the 4 hunting cycles, that is, if more than 140 ignitions of the 200 ignitions belonged to this driving region. If so, the program proceeds to a step 2568, while if not so the program jumps to a step 2577 and the learning advance angle map $T_{LMAP}$ is not corrected. Further, in the step 2568, even if the region $(X_i', Y_j')$ of $T_{LMAP}$ corrected by the knock feedback process coincides with the MBT learned region, $T_{LMAP}$ is not corrected by the MBT feedback. If the learning processes due to knock feedback and MBT feedback happen simultaneously, the delay angle process of $T_{LMAP}$ due to the generation of knockings is done most preferentially. Even if a requirement of angle advance or angle delay occurs, it is neglected. In the case of only MBT feedback learning process, the program proceeds immediately to a step 2569. We define here an MBT learning as the above-mentioned representative driving region $(X_M', Y_M')$ and 8 regions around it. If, for example, $(X_M', Y_M')$ is a point g in FIG. 10, the MBT learning regions are 9 points b, c, d, f, g, h, j, k and l.

In the step 2569, it is determined whether the present dither cycle is just after the beginning of an advanced angle hunting cycle (hunting cycle flag $f_{DSR} = 0$) or just after the beginning of a delayed angle cycle (hunting cycle flag $f_{DSR} = 1$). If $f_{DSR} = 1$, the previous hunting cycles were in the order of advanced, delayed, advanced and delayed angles. In a step 2570, the afore-mentioned condition (iii) is checked while in a step 2571 the afore-mentioned condition (iv) is checked on the average rotation number $\bar{N}$ of each hunting cycle as calculated in the step 2561. If $f_{DSR} 32\ 1$, the condition (ii) is checked in a step 2573 while the condition (i) is checked in a step 2574. As described before, if conditions (i) and (iii) are satisfied, a value of advance angle, $C_5$, is substituted into the MBT learning value in the step 2572. If conditions (ii) and (iv) are satisfied, a value of delay angle, $-C_5$, is substituted in $\Delta\theta$ in the step 2576. In the step 2576, first the value of the learning advance angle map $T_{LMAP}$ at the representative point $(X_M', Y_M')$ of the driving region is corrected by eq. (10).

$$T_{LMAP}(X_M', Y_M') + \Delta\theta \rightarrow T_{LMAP}(X_M', Y_M') \quad (10)$$

Next, the values of $T_{LMAP}$ of 8 points around the representative point are corrected by eq. (11).

$$T_{LMAP}(X_k', Y_l') + C_6 \times \Delta\theta \rightarrow T_{LMAP}(X_k', Y_l') \quad (11)$$

where $C_6$ is a constant, $0 < C_6 < 1$, k, $l = M - 1$, M, $M + 1$ ($k = l = M$ is excluded). Therefore, even if the steady state driving region of the past 4 hunting cycles was in the regions a, b, c, e, f, g, i, j and k; as shown in FIG. 10, if the representative driving region $(X_M', Y_M') = g$, the MBT learning region becomes regions b, c, d, f, g, h, j, k and l. By this, the value of advanced angle at each point is corrected. When none of the conditions (i), (ii), (iii) and (iv) is satisfied, $T_{LMAP}$ is not corrected. The program jumps immediately to a step 2577, where "1" is substituted into the feedback ignition number counter $t_{LN}$ for a new hunting cycle, and the integration value AN of the rotation number integration register is set "0".

The program interruption process has been thus finished.

Figure 19:
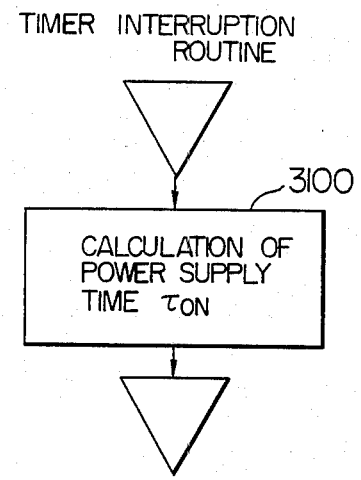

FIG. 19 shows a flow chart of a timer interruption process routine. In a step 3100, the battery voltage VB is introduced into the input port 31, and the coil power supply time $\tau_{ON}$ is calculated from the characteristic of power supply time.

In the above embodiment, although the ignition timing calculated from the driving state of the engine is alternately advanced or delayed in angle by a constant value and a resultant minute difference of the engine speed is detected in order to rewrite the learning advance angle map $T_{LMAP}$ in the direction of increasing the engine speed or in the direction of maximum torque ignition timing, it may be possible to drive with an ignition timing calculated by a driving condition of the engine (called as the base ignition timing), then with an ignition timing of advanced angle relative to the base ignition timing (called the advance ignition timing) and next with an ignition timing of a delayed angle with respect to the base ignition timing (called the "retard ignition timing") and discriminate the direction of the maximum torque ignition timing by comparing the engine speed in these three ignition timings in order to rewrite the learned advance angle map $T_{LMAP}$. Namely for the average engine speed of the base, advanced and retarded ignition timing defined as $\overline{N}_B$, $\overline{N}_A$, and $\overline{N}_R$ respectively, the value of $L_{MAP}$ is rewritten by a value of the advanced angle if $\overline{N}_A > \overline{N}_B > \overline{N}_R$, while it is rewritten by a value of the retarded angle if $\overline{N}_A < \overline{N}_B < \overline{N}_R$. In other cases, $L_{MAP}$ is not rewritten at all.

We claim:

1. A method of controlling an ignition timing of an internal combustion engine including an ignition means and a control computer having a non-volatile memory, said control computer being connected to said ignition means, said method comprising the steps of:
   detecting a first driving state of the engine to produce a first signal;
   detecting a second driving state of the engine to produce a second signal indicative of a knock signal;
   detecting a third driving state of the engine to produce a third signal indicative of a MBT signal;
   calculating a base ignition timing value in accordance with the detection of said first signal;
   correcting said base ignition timing value with a learning correction value stored in said non-volative memory;
   updating the learning correction value in said non-volatile memory by determining whether correction of said ignition timing is required in accordance with the detection of said knock signal and independently of said MBT signal, said knock signal having a higher priority than said MBT signal; and
   updating the learning correction value in said non-volatile memory by determining whether the correction of said ignition timing is required in accordance with the detection of said MBT signal and independently of said knock signal.

2. A method according to claim 1, in which two signals indicative of said second and third driving states of the engine are a signal for indicating whether said ignition timing is in an advanced angle or in a delayed angle relative to the maximum torque ignition timing at which the engine provides a maximum output, and a signal for indicating the occurrence frequency of knocking in the engine, respectively.

3. A method according to claim 1 in which a first signal indicative of said second driving state of the engine is a signal for indicating whether said ignition timing is in an advanced angle or in a retard angle relative the maximum torque ignition timing at which the engine provides the maximum output, and a second signal indicative of said third driving state of the engine is a signal for indicating the amount of occurrence of knocks of the engine, and the memorized content of said non-volatile memory is updated on the basis of said first signal in the direction of said advanced or retard angle when the amount of said knocks is below a predetermined value and updated independently of said first signal only in the direction of said retard angle when the amount of said knocks exceeds a predetermined value.

4. A method according to claim 1, in which said learning correction value is calculated by interpolating the contents memorized in a two-dimensional map of said non-volatile memory.

5. A method according to claim 1 further comprising the steps of:
   rewriting a particular content of said non-volatile memory by a constant value in the direction of a delayed angle when a knock is detected, and
   rewriting the particular content of said non-volatile memory by a constant value in the direction of either advanced or delayed angle when the ignition timing is not at the maximum torque ignition timing.

6. An apparatus for controlling an ignition timing of an internal combustion engine comprising:
   first means for detecting a first driving state of the engine to produce a first signal;
   second means for detecting a second driving state of the engine to produce a second signal indicative of a knock signal;
   third means for detecting a third driving state of the engine to produce a third signal indicative of a MBT signal; and
   control computer means, having a non-volatile memory, for calculating a base ignition timing value in accordance with the detection of said first signal, correcting said base ignitin timing value with a learning correction value stored in said non-volatile memory, updating the learning correction value in said non-volatile memory by determining whether correction of said ignition timing is required in accordance with the detection of the knock signal and independently of said MBT signal, said knock signal having a higher priority than said MBT signal, and updating the learning correction value in said non-volatile memory by determining whether the correction of said ignition timing is required in accordance with the detection of the MBT signal and independently of said knock signal.

* * * * *

UNITED STATES PATENT AND TRADEMARK OFFICE
CERTIFICATE OF CORRECTION

PATENT NO. : 4,510,910
DATED : April 16, 1985
INVENTOR(S) : M. NINOMIYA et al

It is certified that error appears in the above-identified patent and that said Letters Patent is hereby corrected as shown below:

Related U.S. Application Data on Title Page is incorrect.
Should read:

---[63] Continuation of Ser. No. 289,977, Aug. 4, 1981, abandoned.---

Signed and Sealed this

Fifteenth Day of October 1985

[SEAL]

Attest:

Attesting Officer

DONALD J. QUIGG

Commissioner of Patents and Trademarks—Designate